United States Patent [19]

Cendre et al.

[11] Patent Number: 4,821,817

[45] Date of Patent: Apr. 18, 1989

[54] ACTUATOR FOR AN APPLIANCE ASSOCIATED WITH A DUCTED BODY, ESPECIALLY A DRILL ROD

[75] Inventors: André Cendre, Cosne-sur-Loire; Jean Boulet, Paris, both of France

[73] Assignee: SMF International, Cosne-sur-Loire, France

[21] Appl. No.: 816,042

[22] Filed: Jan. 3, 1986

[30] Foreign Application Priority Data

Jan. 7, 1985 [FR] France ................. 85 00142
Apr. 2, 1985 [FR] France ................. 85 04996

[51] Int. Cl.⁴ .................. E21B 17/10; E21B 21/10
[52] U.S. Cl. .................. 175/269; 175/317; 175/324; 175/325
[58] Field of Search ............ 175/324, 325, 73, 76, 175/232, 234, 317, 25, 38, 269, 99

[56] References Cited

U.S. PATENT DOCUMENTS

| | | | |
|---|---|---|---|
| 2,819,040 | 1/1958 | James et al. | 175/325 X |
| 3,220,478 | 11/1965 | Kinzbach | 175/269 X |
| 3,301,337 | 1/1967 | Vaughn | 175/22 |
| 3,799,269 | 3/1974 | Brown et al. | 166/315 |
| 3,799,278 | 3/1974 | Oliver | 175/237 |
| 3,967,680 | 7/1976 | Jeter | 175/38 |
| 3,974,886 | 8/1976 | Blake, Jr. | 175/76 |
| 4,216,830 | 8/1980 | Fredd | 166/319 |
| 4,471,843 | 9/1984 | Jones et al. | 175/73 |
| 4,491,187 | 1/1985 | Russell | 175/325 |

FOREIGN PATENT DOCUMENTS

| | | | |
|---|---|---|---|
| 646129 | 8/1962 | Canada | 175/73 |
| 0056506 | 7/1982 | European Pat. Off. | |
| 317663 | 1/1920 | Fed. Rep. of Germany | |
| 2267501 | 11/1975 | France | |
| 523168 | 8/1976 | U.S.S.R. | 175/38 |
| 1108723 | 4/1968 | United Kingdom | |
| 2029873 | 3/1980 | United Kingdom | 175/232 |
| 2085055 | 4/1982 | United Kingdom | |
| 2077811 | 12/1983 | United Kingdom | |

Primary Examiner—Hoang C. Dang
Attorney, Agent, or Firm—Fay, Sharpe, Beall, Fagan, Minnich & McKee

[57] ABSTRACT

The device has, inside a duct (11) through which flows an incompressible fluid, a first profiled throttling element (17), a differential piston (10) subjected on one side to the pressure upstream of the profiled element (17) and on the other side to the pressure reduced by the element (17), a profiled surface (18) on the piston on the side subjected to the reduced pressure and a second profiled element (16) which are intended to interact to reduce the passage of fluid as a result of the movement of the piston in a first direction and increase the loss of head substantially, and a spring (15) returning the piston (10) in its second direction of movement. The device can serve particularly for actuating a stabilizer of a set of drill rods. In this case, the differential piston has inclined slopes.

8 Claims, 7 Drawing Sheets

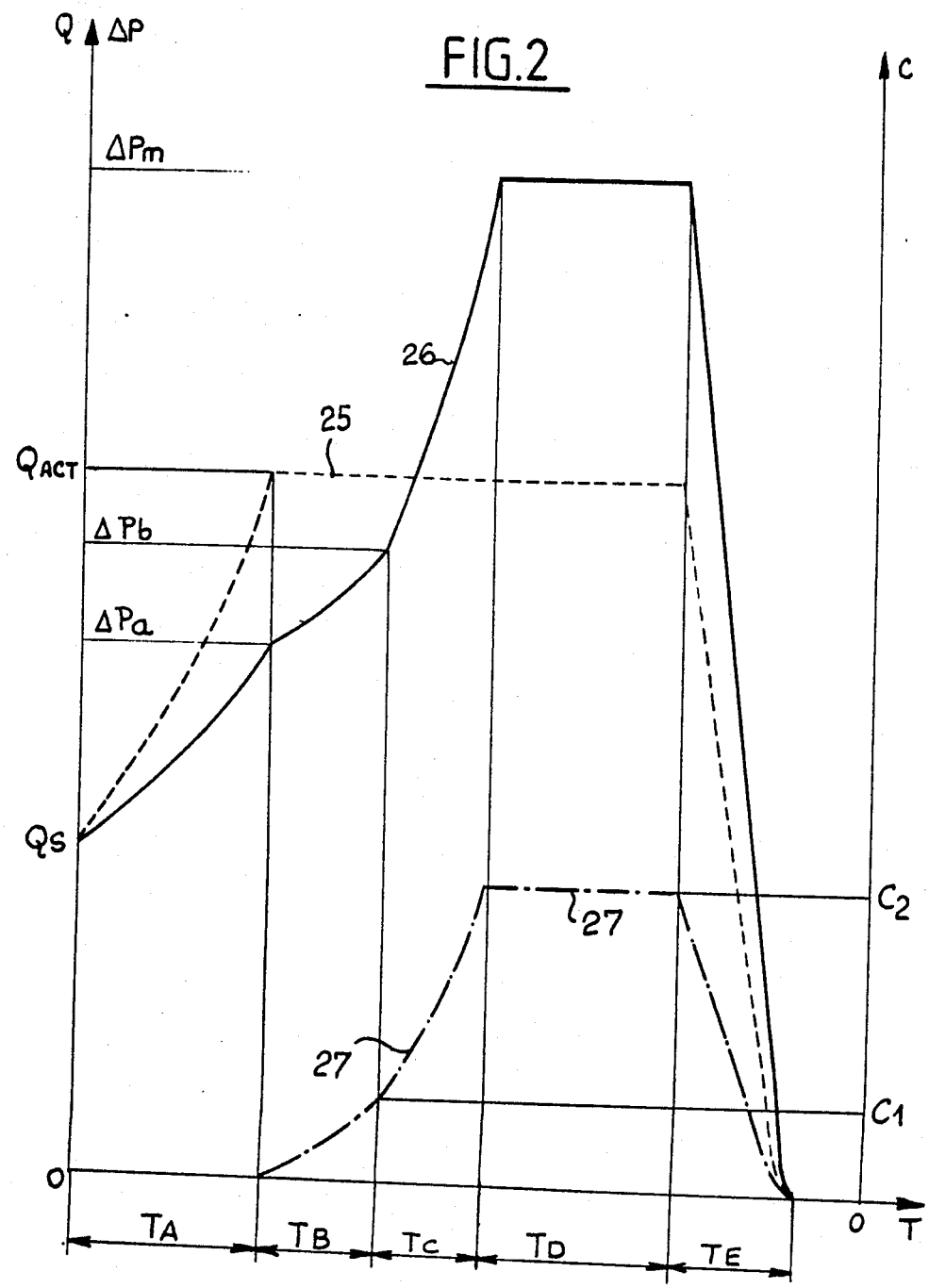

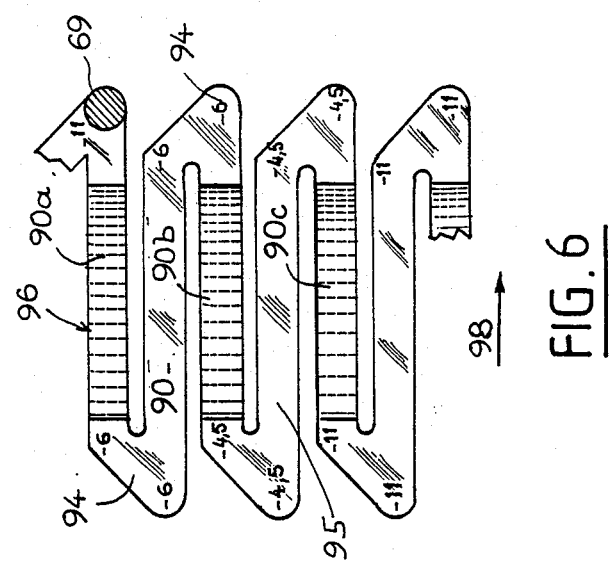
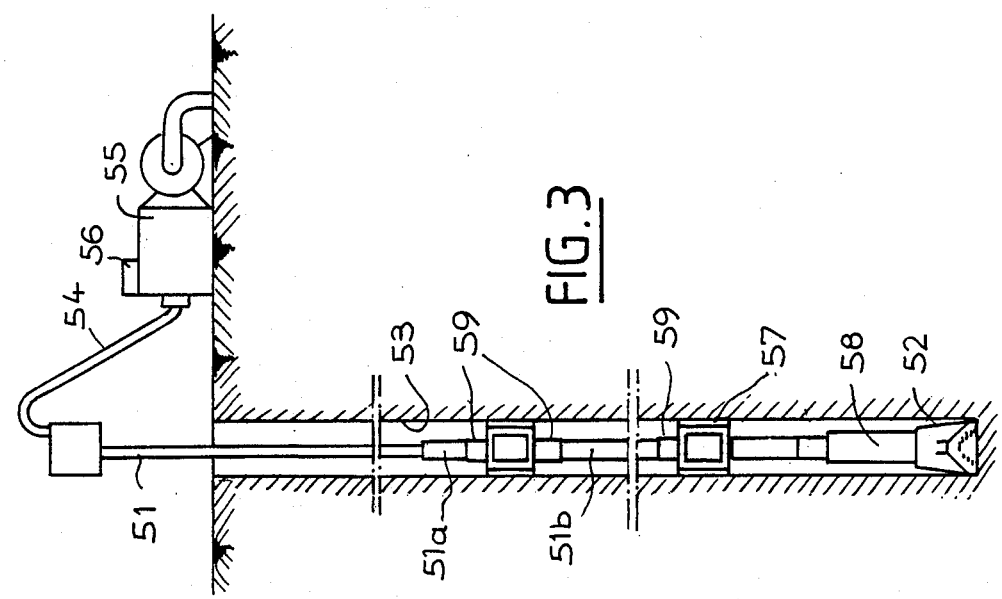

ACTUATOR FOR AN APPLIANCE ASSOCIATED WITH A DUCTED BODY, ESPECIALLY A DRILL ROD

The invention relates, in general terms, to a device for the remote actuation of an appliance associated with a duct, in which circulates an incompressible fluid, and more particularly to a device for actuating a stabilizer of a set of drill rods.

In exploration and extraction of hydrocarbons, the tools used have to generate high powers to carry out operations, such as drilling, and are located at the bottom of a hole at a very great distance from the place at the surface where there are the means of controlling and generating the energy required for operating the tools. These hole-bottom tools are usually supplied with incompressible fluid, such as a drilling mud, by means of a duct of very great length, one end of which is located at the surface and the other end of which is at the bottom of the hole, and which makes it possible to supply the tool with drilling mud. The end of the duct located at the surface is connected to a pumping installation which makes it possible to introduce pressurized drilling mud into the duct at a particular virtually constant rate during the operation of the tool.

Some appliances associated with the duct or with the drill rod and located at a very great distance from the surface have to be remote-controlled and monitored by telemetering devices. This applies, for example, to devices making it possible to orient the drilling tool and monitor its path where inclined wells are concerned.

It is also desirable to provide a reliable and accurate remote-actuation means for the stabilizing devices used in controlled-path drilling installations.

To correct the path of the well during its advance, in order to control its direction perfectly, the use of stabilization devices or stabilizers is known, these being connected to the set of rods, usually in its part adjacent to the tool. Such stabilizer devices comprise a body connected to the set of rods and one or more blades capable of moving in a radial direction relative to the axis of the set of rods. A control means makes it possible to extract the blades towards the outside of the stabilizer body, to vary the bearing distance between the axis of the set of rods and the edges of the drilled hole. By means of these bearing blades, it is possible, depending on circumstances (vertical drilling, inclined drilling of constant direction or with a change of drilling direction), to modify in the desired way the radial forces exerted on the set of rods and consequently on the tool during drilling.

However, the control means known at the present time for making it possible to actuate the stabilizers have a complex structure, are difficult to use and do not allow accurate and perfectly controlled movements of the bearing blades.

In general terms, there has not yet been known a device which is simple and perfectly reliable to operate and which makes it possible to actuate remotely an appliance associated with a duct, in which a fluid under pressure circulates, and control the operation of this appliance, while at the same time remaining compatible with the associated telemetering devices arrange near the appliance.

The object of the invention is to propose a device for the remote actuation of an appliance associated with a duct, having a first end via which an incompressible fluid is conveyed by pumping means at a specific operating rate, and a second end which is distant from the first end at which the incompressible fluid is used, for example, as a working fluid, the actuation device having a simple structure and being reliable to operate and capable of being employed without the use of an energy source other than that supplied by the incompressible fluid and without actuation elements outside the duct, the operation of the actuation device being controllable.

To achieve this object, the actuation device according to the invention comprises, inside the duct, in a zone distant from the first end:

a first profiled throttling element limiting the passage cross-section of the fluid and generating a loss of head variable as a function of the flow rate of the fluid, a differential piston mounted so as to be movable in the axial direction within the duct and subjected on one side to the pressure of the fluid upstream of the first throttling element and on the other side to the fluid pressure reduced by the first profiled throttling element, a profiled surface provided on the piston and a second profiled throttling element integral with the duct, which are intended to interact to limit the fluid passage and increase the loss of head substantially on either side of the piston during the movement of the latter in a first direction of movement, a means of returning the piston in its second direction of movement opposite the first, a means of determining the actuation phases by measuring the pressure at the first end of the duct, and a receiving means on the appliance, actuated by the piston or as a result of the pressure difference on either side of the piston, the force of the return means and the first throttling element being such that the piston starts to move in the first direction of movement at an actuating rate higher than the operating rate of the fluid in the duct.

When the duct is a set of hollow rods of a controlled-path drilling device carrying a drilling tool fastened to one of its ends, the appliance actuated by the piston being a stabilizing device comprising a body connected to the set of rods and at least one bearing blade mounted so as to be radially movable in the body, the piston of the actuation device is mounted in the central bore of the body so as to be movable not only in terms of translation, but also in terms of rotation about the axis of the set of rods, and it has on its outer lateral surface longitudinal slopes which are inclined in a radial direction relative to the axis of the rods and are arranged one after the other along the periphery of the piston and which are connected to one another to form a continuous actuation surface by means of matching guide parts for the step-by-step rotational movement of the piston and for its return into its initial position, at least one actuating finger, mounted in the body so as to be radially movable, interacting with the continuous actuation surface on the one hand and with the blade on the other hand, to extract the latter radially during the movement of the piston in a first direction of movement which is accompanied by a greatly increased loss of head in the circulating drilling fluid at the end of the actuating movement of the piston.

To make the invention easy to understand, several embodiments of an actuation device according to the invention, used in the drilling of oil-wells and the extraction of oil, will now be described as non-limiting examples, with reference to the attached Figures.

In these Figures:

FIG. 2 is an operating graph of the device illustrated in FIG. 1a, showing the variations in time of various characteristic parameters during an operating cycle of the device.

FIG. 3 is a diagrammatic general view of a controlled-path drilling device possessing stabilizers controlled by an actuation device according to the invention.

FIG. 6 is a laid-out view of the actuation surface, the blades and the piston of the stabilizer.

Figure 1:
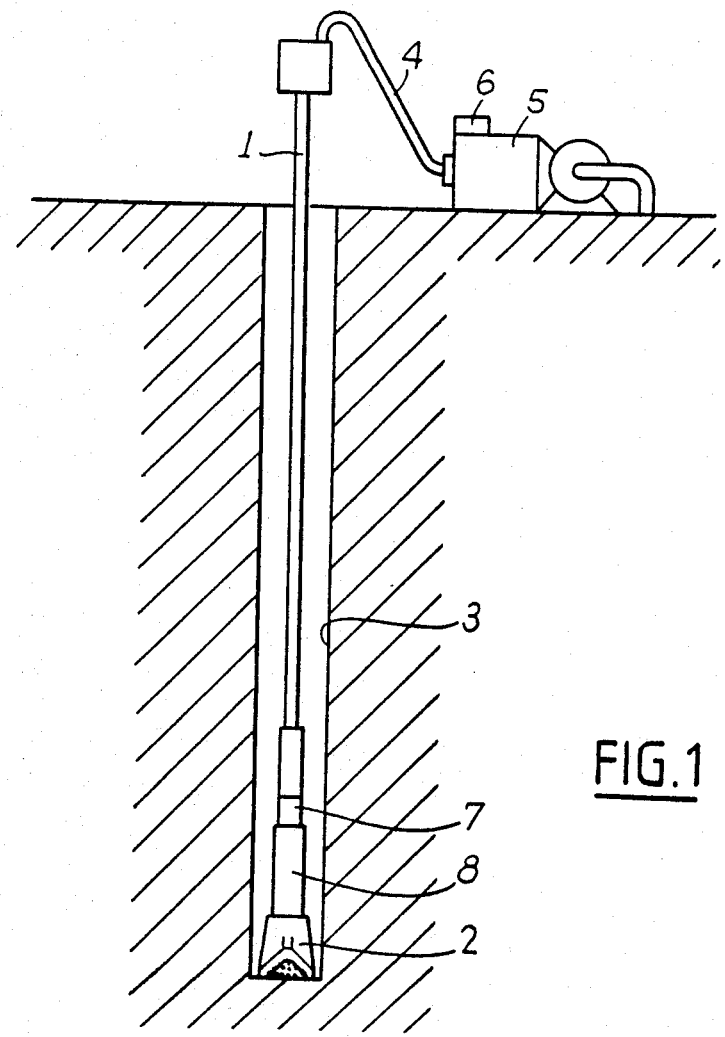
FIG. 1 is a diagrammatic view of a drilling installation incorporating an appliance which can be actuated by a device according to the invention.

FIG. 1 shows a drilling installation comprising a set of rods 1 carrying the drilling tool 2 at its lower end. The tool 2 has been shown in its working position at the bottom of the hole 3. The set of hollow rods 1 forms a duct of great length, one end of which is connected to the hole-bottom tool 2 and of which the other end located at the surface is connected to a duct 4 allowing drilling mud to be injected at high pressure and at a constant rate into the inner space of the rods 1. For this purpose, the duct 4 is connected to a pumping installation 5, on which a measuring device 6 makes it possible to determine the pumping pressure accurately. The drilling mud descends in the set of rods, supplies the tool 2 at the bottom of the hole and rises to the surface again via the hole 3 outside the set of rods 1. An appliance 7 for orienting the tool 2 and a telemetry unit 8 are associated with the set of rods 1 above the part where the tool 2 is joined to the set of rods. The pressurized drilling mud is used as a working fluid for the drilling tool 2.

Figure 1A:
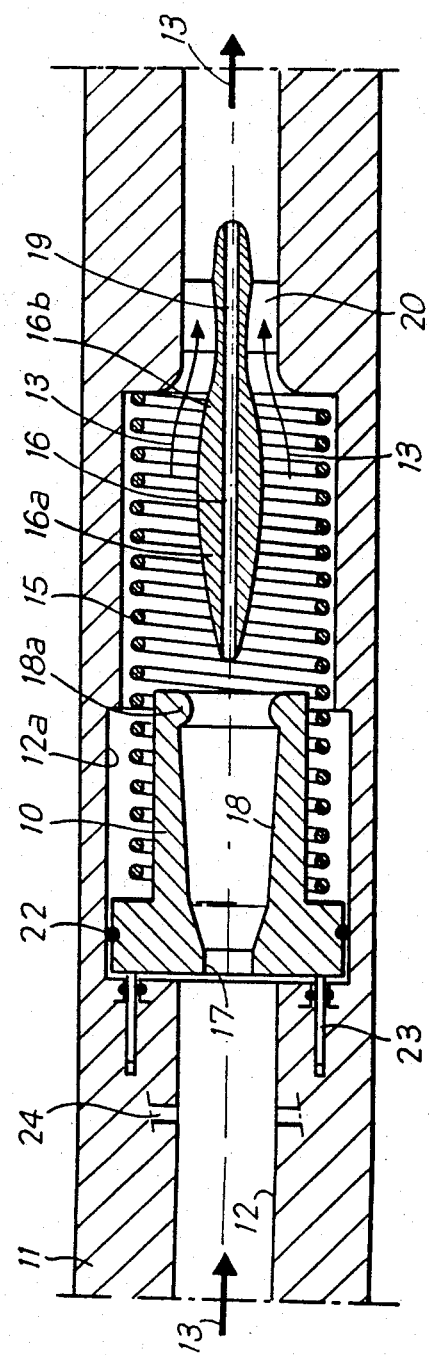
FIGS. 1a, 1b, 1c and 1d are views in longitudinal section of an actuation device according to the invention in four different embodiments.

FIG. 1a shows an embodiment of an actuation device according to the invention, making it possible to operate remotely an appliance, such as the appliance 7 for orienting a drilling tool, by supplying it with the requisite driving power. This device is arranged in a part 11 of the duct of great length formed by the set of rods. This part 11 can itself consist of a connection piece between the rods, an end part of a rod or a part of the appliance 7 which can be connected to the set of rods. This hollow part 11 receives, in its central bore 12, the stream of drilling mud which circulates in the direction of the arrows 13 to arrive at the tool 2 at the bottom of the hole. The bore 12 in the part 11 of the set of rods has a widened portion 12a, inside which the actuation device is mounted. This device comprises a differential piston 10 of tubular profiled shape, a return spring 15 and a profiled element 16 arranged axially in the duct 11.

The inner bore of the piston 10 comprises two successive portions in the direction 13 of circulation of the drilling mud, namely a first profiled portion 17 forming a diaphragm introducing a loss of head into the duct, and a second profiled portion 18 of frustoconical shape, having a throttling portion 18a at its end and connected to the diaphragm 17 by means of an annular surface. This prOfiled surface 18 can also be of cylindrical shape. The profiled element 16 or needle comprises a cone-shaped front part 16a and a rear part 16b allowing it to be fastened inside the duct 11 by means of spacers 20. The needle is perforated with a central bore 19. In other alternative embodiments of the device, this needle 16 can be made without any central perforation.

The piston 10 is mounted in a sealed manner, by means of a set of O-ring gaskets 22, in the part 12a of the bore of the duct forming the chamber of the piston 10. In its front part, the piston 10 is extended in the form of a guide part 23 mounted so as to slide and be guided perfectly within orifices machined in the part 11 of the duct. Other mechanical connections can be made between the part 11 of the duct and the piston 10. The piston 10 is returned into its forward position, as shown in FIG. 1a, by a spring 15, the force of which is intended to keep the piston in this forward position, when the drilling mud circulates in the duct at its normal rate or at an operating rate below the control rate of the actuation device.

The shape of the profiled front part 16a of the element 16 is designed to interact with the profile 18 of the piston, to generate a substantial loss of head in the circulation of the drilling mud, when the piston moves towards the rear, that is to say from left to right in FIG. 1a. This loss of head attributed to the interaction of the profiled elements 16 and 18 increases the total loss of head of the device considerably and very quickly.

FIG. 2 shows an operating graph for the device shown in FIG. 1, the time being plotted on the abscissa and the flowrate Q of the drilling mud, the loss of head $\Delta P$ through the actuation device and the stroke of the differential piston 10 being plotted on the ordinate. The variation in time of the flowrate Q during an operating cycle of the actuation device has been represented by the curve 25 indicated by broken lines, the variation in loss of head $\Delta P$ by the curve 26 indicated by unbroken lines and the variation in the Stroke C of the piston 10 by the curve indicated by dot-and-dash lines 27.

The origin of the graph represents the operating point at the operating rate QS of the drilling mud and with zero movement of the piston 10.

To use the actuation device, the flowrate of the drilling mud is increased progressively during the first period $T_A$ of the actuating cycle, to bring this flow rate from the value 0 or QS to a value $Q_{ACT}$ or actuating rate. At the end of this part of the cycle, the loss of head in the profiled front part 17 of the piston 10 reaches a value $\Delta Pa$ which is such that the excess pressure on the front face of the piston generates a force which begins to exceed the return force of the spring. The piston then moves to the rear to execute a stroke C1, the flowrate being maintained at the value $Q_{ACT}$. The loss of head increases slowly from the value $\Delta Pa$ to the value $\Delta Pb$ as a result of a slow reduction in the outlet cross-section of the piston 10 during the second phase B of the operating cycle. The stroke C1 of the piston 10 has then brought its profile 18 opposite the profile 16a of the needle 16. The loss of head $\Delta P$ increases very quickly and the piston moves to the rear at an increased speed during the phase C of the operating cycle. The flowrate is maintained at the value $Q_{ACT}$ by means of the pumping installation 5, the movement of the piston is self-maintained as a result of the increase in the loss of head, and the piston 10 moves until it comes up against the rear part of its chamber 12a by executing the stroke C2. The loss of head then changes from the value $\Delta Pb$ to its maximum value $\Delta Pm$. This increase in the loss of head is considerably greater than that which could be obtained by means of an increase in the flowrate in a diaphragm with a constant aperture.

The front part 23 of the piston is connected to a movable member of the appliance 7, to give the tool 2 an orientation angle.

At the same time or independently, the excess pressure $\Delta P$ of the drilling mud, sampled by means of ducts 24 in front of the piston 10, can also be used to actuate a hydraulic receiving means of the appliance 7. If, during the manoeuvre of the appliance 7, at the constant rate $Q_{ACT}$ the force exerted by the piston 10 becomes insufficient to continue carrying out the manoeuvre, the loss of head no longer increases. A plateau at a value of $\Delta Pi$ is recorded. It is then sufficient to bring the flowrate to a value $Q'_{ACT}$ higher than $Q_{ACT}$ to end the manoeuvre of the appliance 7. The maximum loss of head occurs at a value $\Delta'Pm$. The flow rate can subsequently be returned to and maintained at the value $Q_{ACT}$ which is sufficient to keep the piston 10 in the rear position.

As long as the flowrate is maintained at the value $Q_{ACT}$, the differential piston 10 remains in its rear position and the loss of head $\Delta P$ remains at its maximum value.

The piston is returned to its forward position shown in FIG. 1a by progressively reducing the flowrate to bring it down to the value 0 (phase E). The tool 2 can subsequently be operated by increasing the flow rate to the value of the operating rate $Q_S$, and with the appliance associated with the actuation device being in the new position.

During the entire operating cycle, the flowrate is increased to and maintained at $Q_{ACT}$ by means of the pumping installation 5, and the variations in pumping pressure $\Delta P$ are detected and recorded by the measuring instrument 6. Both the control and the monitoring of the operating cycle are therefore carried out without difficulty from the surface, without using a remote-control device. In particular, it is easy to detect and record a stop of the piston before the end of the manoeuvre, this producing a pressure plateau. In this case, the manoeuvre is continued by increasing the flowrate to a sufficient value to release the appliance. The pumping means 5 must therefore make it possible to increase the flow rate to values higher than $Q_{ACT}$, where required. In general, during the entire operating cycle of the device, recording the excess pressure corresponding to the loss of head $\Delta P$ as a function of time makes it possible to ascertain the position of the piston 10 and therefore monitor the actuation of the device. A recorder recording the pressure as a function of time is therefore associated with the measuring device 6.

To obtain a return of the piston to its initial position after the appliance has been actuated, it may only be necessary to reduce the pumping rate to a non-zero value below $Q_S$. The tool 2 can subsequently be operated by increasing this rate again to the value $Q_S$.

Figure 1B:
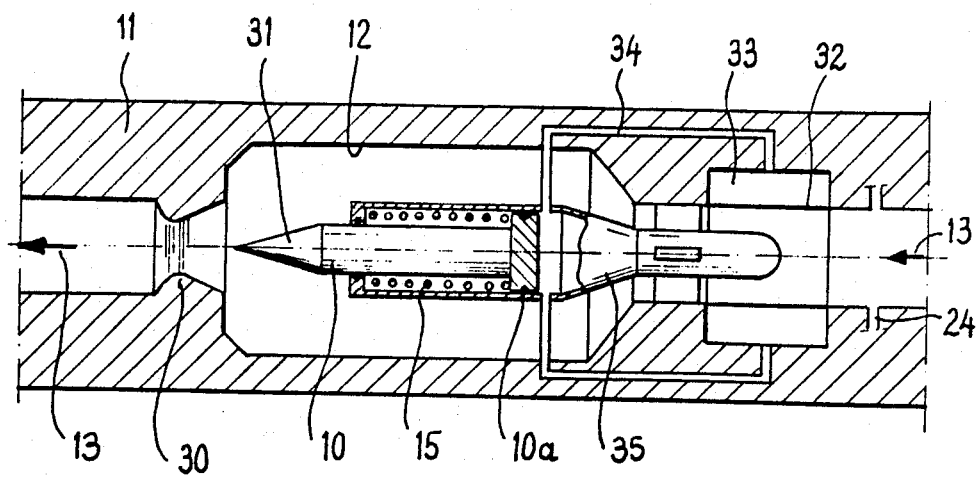
Figure 1C:
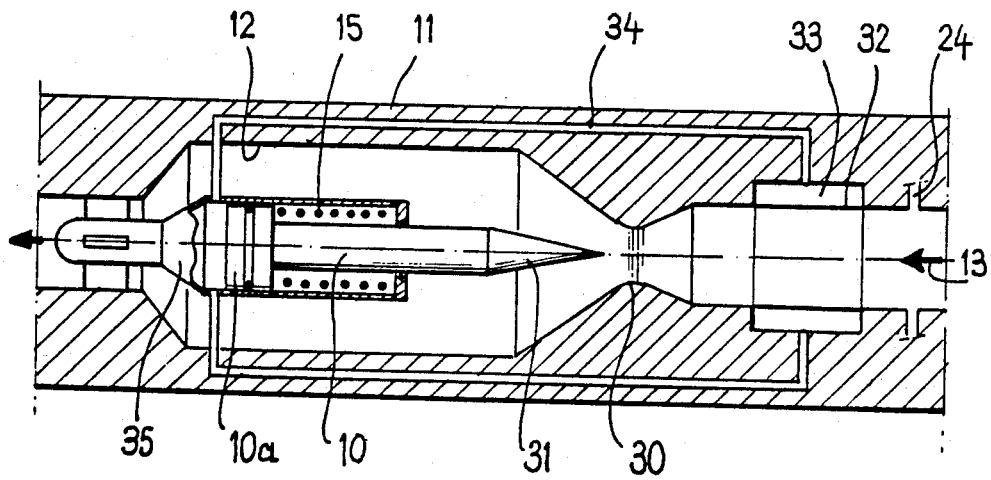
Figure 1D:
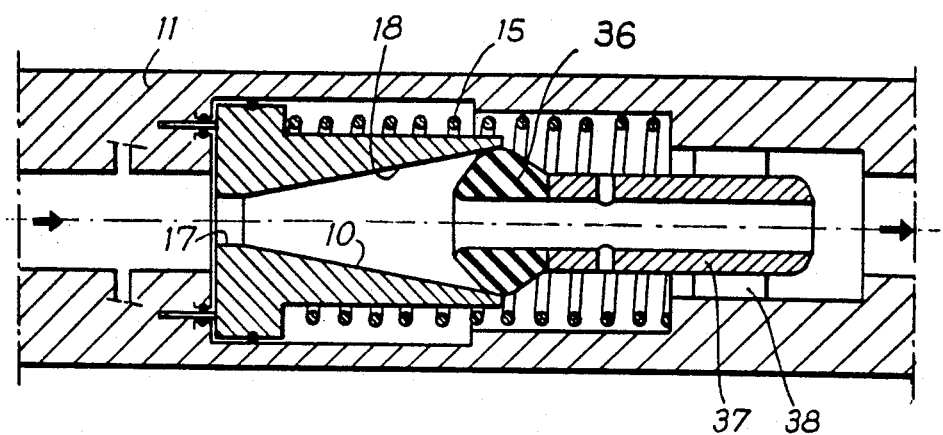

FIGS. 1b, 1c and 1d show alternative embodiments of the actuation device. The corresponding elements in FIGS. 1a to 1d bear the same reference numerals.

In FIG. 1b, it can be seen that the piston 10 this time consists of a solid piece having a profiled part 31 intended for interacting with a profiled element 30 machined on the inner surface of the duct 11. This element 30 performs the function of both the diaphragm 17 and the needle 16 of the embodiment illustrated in FIG. 1a. The piston 10 has a cylindrical part 10a provided with a O-ring gasket mounted so as to be movable within a chamber provided in a cylinder 35 mounted in the axis of the duct 11. The chamber of the piston 10 receives a hydraulic fluid at one of its ends by means of conduits 34 communicating at their other end with an annular chamber 33 coaxial relative to the duct and closed by means of a flexible cylindrical diaphragm 32. The hydraulic fluid acting in the piston chamber and in contact with its front face is in pressure equilibrium with the drilling mud upstream of the actuation device. In contrast to this, the rear face of the piston is in contact with the drilling mud at a pressure reduced by the amount of the loss of head introduced by means of the profiled element 30.

The assembly consisting of the piston 10 and spring 15 is mounted in a sealed manner within the chamber of the cylinder 35 receiving a hydraulic fluid not contaminated by the drilling mud.

The device operates in a practically identical way to the device illustrated in FIG. 1a, the loss of head $\Delta P$ introduced by means of the element 30 becoming, as soon as the flowrate reaches the value $Q_{ACT}$, sufficient for the piston to move in the direction of flow (arrow 13). The interaction between the parts 31 of the piston and of the element 30 then increases the loss of head, so that the piston moves into its end position.

As before, the drilling mud under excess pressure is recovered via ducts 24 for actuating the appliance 7 associated with the duct.

FIG. 1c shows an embodiment of the device which associates elements identical to those of the device of FIG. 1b, but in a different arrangement. The cylinder 35 and the chamber of the piston 10 are oriented in the opposite direction in relation to the circulation of the drilling mud (arrow 13). A closed circuit comprising the annular chamber 33, the ducts 34 and the chamber of the piston 10 contains a hydraulic fluid completely isolated from the drilling mud, and the profiled element 30 of the duct introduces a loss of head which makes it possible to start the movement of the piston when the flowrate reaches the value $Q_{ACT}$. The profiled part 31 of the piston then interacts with the element 30 which performs the function both of the diaphragm 17 and of the needle 16 of the embodiment of FIG. 1a.

As before, the excess pressure $\Delta P$ is recovered by means of ducts 24 for actuating the appliance 7.

In the embodiment illustrated in FIG. 1d, the piston 10 has a tubular shape and a double profile 17, 18, in the same way as the piston shown in FIG. 1a.

The frustoconical profile 18 interacts with a member 36 for the progressive closing of a duct 37 secured coaxially within the duct 11 by means of spaces 38 which make it possible to fasten the duct 37 and the shut-off element 36.

As soon as the flowrate reaches the value $Q_{ACT}$, the piston moves to the rear and the profile 18 closes the deformable element 36, at the same time increasing the loss of head, with the result that the piston 10 moves into its end position up against the rear stop.

In the devices illustrated in FIGS. 1b, 1c and 1d, the piston can be returned into its initial position by bringing the flowrate down to a low value which can be a zero value.

FIG. 3 shows a drilling installation comprising a set of drill rods 51 carrying at its lower end a drilling tool 52 and connected at its other end, by means of a duct 54, to a pumping installation 55 which makes it possible to inject drilling mud through the interior of the set of rods 51 to the tool 52 in its working position at the bottom of the hole 53.

The set of rods 51 comprises successive rods, such as 51a and 51b, which, as can be seen in FIG. 1, are connected to one another and to the drilling tool 52 by means of intermediate elements comprising a stabilizer 57 and joining pieces 59.

Arranged on the pumping device 55 is a means 56 of measuring the pumping pressure of the drilling mud.

A measuring unit 58 is associated with the tool and makes it possible, in particular, to measure the orientation of the set of rods 51.

Figures 4, 5:
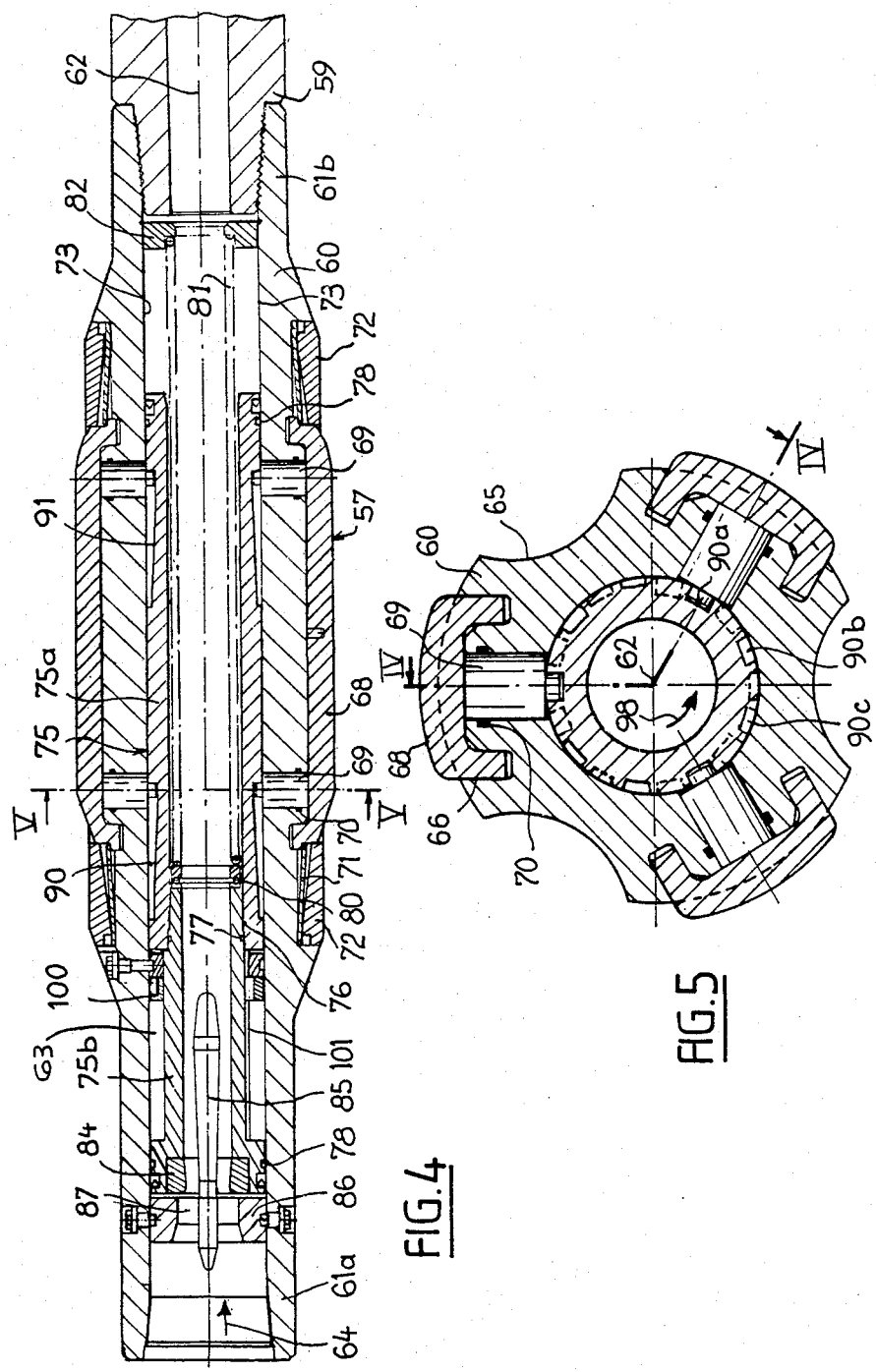
FIG. 4 is a view in longitudianl section, along the line IV—IV of FIG. 5, of a stabilizer of the drilling device illustrated in FIG. 3.
FIG. 5 is a sectional view of the stabilizer along the line V—V of FIG. 4.

FIG. 4 shows a stabilization device deSignated as a whole by reference numeral 57, which comprises a body 60 of general tubular shape having tapped ends 61a and 61b making it possible to join the stabilizer 57 to the set of rods or to the tool by means of threaded connections, such as 59. When the stabilizer is connected to the set of rods, the axis 62 of the bore 63 of the body 60 is identical to the axis of the set of rods. The drilling mud circulates in the set of rods and the stabilizer axially in the direction of the arrow 64.

As can be seen in FIGS. 4 and 5, the body 60 has, on its peripheral surface, indentations 65 to allow the drilling mud to pass outside the stabilizer when it returns to the surface within the hole 53. The body 60 also has slots 66 serving for accommodating the bearing blades 68. The stabilizer illustrated in FIGS. 4 and 5 has three bearing blades 68 arranged in orifices 66 placed at 120° round the body of the stabilizer. Leaf springs 71, one end of which is fastened to the body 60 by means of screws, bear by means of their other end on the end parts of the blades 68, so as to keep them in the position retracted in the radial direction, as shown in FIGS. 4 and 5. Closing pieces 72 mounted in the end parts of the orifices 66 outside the leaf springs 71 make it possible to guide the blades 68 in their radial direction of movement. A play is reserved for assembly between the leaf spring 71 and the closing piece 72, to allow a certain movement of the bearing blade in the radial direction between its position of complete retraction, shown in FIGS. 4 and 5, and a position of extraction or extension of the bearing blade 68 under the effect of a pair of actuating fingers 69 mounted so as to be movable in the radial direction within the body 60. Each of the fingers 69 is mounted movably and in a sealed manner in the body 60 by means of an O-ring gasket 70.

Mounted inside the bore 63 of the body 60 is a tubular piston 75 which, to make it possible to mount it, has two parts 75a and 75b joined to one another in a sealed manner by means of a thread 76 and a gasket 77. The piston 75 is mounted so as to slide in the bore 63 by means of a part of its peripheral surface and two O-ring gaskeS 78 arranged at itS ends.

Located at the end of the part 75b of the piston, within the part 75a of this piston, is a ball thrust-bearing 80, against which the end of a helical spring 81 comes to rest, the other end of the latter bearing on a stop 82 fastened to the body 60 inside the bore 63. A profiled annular piece 84 is also mounted inside the part 75b of the piston 75 at its end corresponding to the inflow of the drilling fluid circulating in the direction of the arrow 64.

A second profiled piece 85 or needle is arranged inside the body 60 in the axis 62 of the bore 63 of this 60. The needle 85 is fastened in this body 60 by means of an annular supporting piece 86 having radial spacers 87 for fastening the needle 85.

The drilling fluid circulating in the direction of the arrow 64 experiences a loss of head as a function of its flowrate, when it penetrates inside the piston 75 via the profiled inlet 84. At a certain flowrate, called the actuation rate, the pressure difference on either side of the piston 75 becomes sufficient to exert a force greater than the force of the spring 81 on this piston, with the result that the piston 75 starts to move axially in the direction of the arrow 64. The inner profile of the piece 84 interacts with the outer profile of the needle 85 to reduce the passage cross-section of the fluid progressively and increase the loss of head in proportion. At the end of the movement of the piston, the loss of head becomes very great and corresponds to a value which can easily be detected at the pumping installation by means of the pressure-measuring device 56 associated with this pumping installation 55. Thus, the movement of the piston 75 is controlled by the flowrate of the pumping fluid and iS monitored perfectly from the surface by means of a pressure measurement.

Such a remote-actuation device has high stability, since the loss of head generating the force moving the piston increases continuously during the movement of this piston.

Machined on the outer lateral surface of the piston 75 are actuating slopes forming two sets 90 and 91 spaced longitudinally from one another on the piston 75 and each interacting with an assembly of three actuating fingers 69 located at one of the ends of the blades 68.

The slopes 90 and 91 are inclined in the same sense in the radial direction in relation to the axis 62 common to the piston 75 and to tne bore 63. This inclination makes it possible to move the blades radially during the axial movement of the piston in the direction of the arrow 64.

By reference to FIGS. 5 and 6, it will be seen that successive inclined slopes 90a, 90b, 90c are arranged one after the other on the piston 75 over its periphery. A complete cycle of movement of a blade 68 is obtained by means of the three successive inclined slopes 90a, 90b and 90c, of which the machining depths at their ends and from the outside diameter of the piston 75 are indicated (in $10^{-3}$m) in FIG. 6. Each of the fingers 69 is maintained, via the springs 71 of the corresponding blade 68, in contact with the bottom of a slope 90 by means of an end part machined in the form of a spherical bearing surface.

As can be seen in FIG. 6, the movement of the piston in the direction of the arrow 93 makes it possible to shift the end of the finger 69 from the level $-11$ to a level $-6$ as a result of the interaction of this finger 69 with the slope 90a. In the same way, the slope 90b makes it possible to shift the finger from the level $-6$ to the level $-4.5$. These two movements along the slopes 90a and 90b are therefore accompanied by a radial movement of the fingers 69 towards the outside of the body 70 and therefore by an outward movement of the blades 68. In fact, as can be seen in FIG. 5, the distribution of the slopes over the periphery of the piston 75 is such that, at each moment, all the fingers 69 come in contact with a set of identical slopes, and the movements of these fingers in the radial direction are therefore identical at every moment. The slope 90c corresponds to a shift of the fingers 69 from the level $-4.5$ to the level $-11$, and this corresponds to a return of the fingers 69 to their initial position and a return of the blades 68 to their retracted position.

Thus, each of the three fingers 69 of the assembly shown in FIG. 5 executes a complete cycle of movement with three slopes 90a, 90b and 90c. The total number of slopes constituting the assembly 90 is therefore 3×3=9.

It can be seen from FIGS. 5 and 6 that the slopes 90a, 90b and 90c are connected to one another by means of curved parts 94 and by means of straight parts 95 of constant level, to form a continuous actuating surface 96 arranged on the periphery of the piston 75. The curved parts 94 joining the end of the slopes 90 to the end of the straight parts 95 make it possible to rotate the piston 75 step by step in the direction of the arrow 98 as a result of the interaction of the end of the finger 69 with the curved part 94, at the end of the movement of the piston 75 in one direction or the other. Each of the steps corresponds to the angular distance between the slope 90 and the adjacent plane part 95, that is to say 360°/18=20°.

In one direction, the driving force is generated as a result of the loss of head of the drilling fluid and, in the other direction, by the energy stored in the spring 81.

The step-by-step rotary movement of the piston can occur only in the direction of the arrow 98, a free-wheel 100 (FIG. 4) being mounted in the bore 63 of the body 60 round the part 75b of the piston 75. The piston is made integral in terms of rotation with this free-wheel by means of a key engaged in a longitudinal keyway 101 machined on the part 75b of the piston. The piston 75 can thus move longitudinally relative to the free-wheel 100 to execute its to-and-fro movements under the action of the fluid and under the action of the spring 81.

Thus, each of the longitudinal movements of the piston in the direction of the arrow 64 as a result of the action of the circulating drilling fluid results in a radial movement of the blades in the extraction direction (two successive steps) and in the retraction direction (one step of longitudinal movement). Because the steps of longitudinal movement of the piston are recorded at the surface, the exact position of the blades is ascertained, thus making it possible to monitor the stabilizer very effectively. This recording of the steps in the way indicated is extremely easy, because the end of each of the drive movements of the piston in the longitudinal direction results in a sharp increase in the pumping pressure.

The mode of operation of the device is as follows:

With blades in their retracted position, as shown in FIGS. 4 and 5, a flow at least equal to the actuation rate of the device is conveyed into the set of rods, thus causing a movement of the piston and an automatic and progressive increase in the loss of head, until the piston reaches its end position, the loss of head then being at the maximum. Recording the pressure from the surface makes it possible to determine the end of a step of movement of the piston. If the blades are extracted a sufficient amount, the device is automatically maintained in position as long as the feed flow of drilling fluid is not cancelled. If an additional step is to be executed to extract the blades an additional amount, the feed flow of drilling fluid is cancelled and the piston returns into its initial position as a result of the action of the spring 81. Meanwhile, a rotation of the piston through 20° has allowed the finger 69 to be positioned on a plane part 95 of the actuating surface 96. At the end of the plane part 95, the curved part 94 of the actuating surface 96 allows the piston to rotate 20° again in the desired direction by means of the free-wheel 100, so that the finger 69 is in alignment with the following slope 90b. As a result of an increase in the flowrate of the drilling fluid up to the value of the actuation rate, the piston 75 is moved in the direction of the arrow 93, the fingers 69 and the blades 68 being moved an additional step outwards and in the radial direction. It is obvious that the system can be returned to the initial state as a result of successive passes of the fingers 69 over the plane part 95 at the level −4.5 and over the slope 90c.

All these movements can be followed perfectly from the surface by recording the pressure.

The main advantages of the actuation device according to the invention are evident in the description which has just been given: this actuation device does not require any remote-control means, because it is operated and monitored by using the pumping and measuring means normally associated with the duct of great length; this actuation device is particularly simple and has a high operating reliability; it is manoeuvred by means of very simple operations which can easily be monitored; there is no need to use any element in addition to those located in the duct at the time when it is installed.

If the actuation device is used to control a stabilization device, the successive movements of the bearing blades in one direction or other are monitored perfectly and take place under very good conditions of stability. On the other hand, the device is of relatively low overall size, in spite of its many possibilities.

The invention is not limited to the embodiments which have been described; on the contrary, it embraces all their alternative forms.

Thus, the piston and the profiled elements associated with it can have a different form from those described. The first profiled element can be associated with the piston or, on the contrary, independent of this piston. This first profiled element can be separate from or merged with the second profiled element. The form of these profiled elements can be different from the forms described. These forms are intended to ensure that the pressure/time graph and the maximum loss of head Pm correspond to the operating conditions of the appliance with which the actuation device is associated.

The means of returning the piston can be different from a mechanical spring.

The means receiving the driving force of the piston or the pressure difference, which is provided on the appliance, can have any form which makes it possible to transmit this driving force to the active elements of the appliance.

The operating cycle of the tool can differ from that described, and in particular the phase preceding the rapid movement of the piston corresponding to a sharp increase in the loss of head can be accompanied by an extremely low loss of head, thus making it possible to separate the inactive phase distinctly from the active phase of the appliance.

Where a device actuating a stabilizer is concerned, the number of different successive slopes forming a set of slopes can be different from three, if a movement with a series of steps less than or more than three is to be executed. It is possible to use less than three blades and, if appropriate, a single bearing blade on the stabilizer, either associated with other fixed blades or not, or on the contrary use a number of blades greater than three. Blades arranged in the direction of the axis of the set of rods or blades inclined relative to this axis can be used.

At all events, the number of slopes arranged on the periphery of the actuating piston will equal the number of blades multiplied by the number of different steps of movement of the blades in the radial direction.

The blades can be mounted in a different way from that described, and blades of a different form can be used.

A means different from a free-wheel can be associated with the piston, to prevent it from rotating in one direction and to allow it to rotate in the other direction.

The drilling device according to the invention can incorporate any number of stabilizers, each having any number of blades, at least one of which is radially movable.

In general terms, the actuated appliance can consist not only of devices orienting a drilling tool or devices stabilizing a set of rods, but also of devices for perforating a casing or for inflating sealing diaphragms in a well or a bore-hole, using the excess pressure attributed to the loss of head. The actuation device according to the invention can be used for any appliance employed in the drilling of oil wells or the extraction of oil or in other sectors, in which ducts of great length which are inaccessible or accessible only with great difficulty are used, to distribute an incompressible fluid. The invention is used particularly in the distribution of water or in irrigation, the appliance associated with the duct then being a multi-way valve making it possible to transfer the distributed water from one duct to another. This operation is carried out very simply by increasing the flowrate of the water to a level higher than the operating rate, then reducing this flowrate to a very low level or to zero, subsequently increasing it again to the level corresponding to the operating rate. The reverse operation can, of course, be carried out subsequently by increasing the flowrate again beyond the operating rate up to the actuation value.

In very general terms, the invention is used in all cases where a fluid is used as a working fluid in ducts of great length at least partially inaccessible, and also in all cases where fluid is distributed via ducts of great length having inaccessible parts.

We claim:

1. A remote controlled actuation device in combination with a body in which the device is positioned, a stabilizer which is actuated by the device, a drill string to which the body is secured and a monitoring device, the stabilizer being operatively connected to both the body and the actuation device, the drill string having a bore of a substantially constant internal diameter that has an incompressible fluid circulating therein in an axial direction, the drill string bore comprising a first end through which the incompressible fluid is introduced by a pumping means at an adjustable flow rate and a second end which is distant from the first end and wherein the incompressible fluid is used as a working fluid, the actuation device being positioned within a bore in the body, the body bore being substantially coaxial with the drill string bore, comprising:
   a differential piston mounted so as to be movable in the axial direction within the body bore, said piston having a tubular shape and a central bore which is substantially coaxial with the body bore and which piston bore comprises successively, in the direction of circulation of the incompressible fluid:
   a first profiled throttling portion the minimum internal diameter of which is smaller than an internal diameter of the body bore, and
   a second profiled portion having an internal surface of a diameter which widens in the direction of circulation of the incompressible fluid;
   a protruding profiled element secured to the body and disposed coaxially with the differential piston and having a profiled external surface matching the internal surface of the second profiled portion of the piston and facing said second profiled portion wherein a maximum outer diameter of the protruding profiled element is sufficiently smaller than an internal diameter of said first and second piston portions so as to leave an annular space through which working fluid continues to flow at all positions of said piston;
   a spring arranged between a part of the piston and a part of the body for biasing the piston in a direction of movement opposite the direction of circulation of the incompressible fluid;
   a means for measuring the pressure of the incompressible fluid at the first end of the drill string bore, said means being operatively connected to the drill string;
   at least one bearing blade mounted on an outer periphery of the body so as to be radially movable in relation to the body, wherein the differential piston is mounted in the body bore so as to be movable not only axially, but also rotationally about an axis of the body;
   longitudinal grooves having bottom surfaces inclined in a radial direction relative to the axis of the drill string, said grooves being provided on an outer surface of the differential piston and arranged in a spaced manner thereon and connected to one another by connecting grooves to form a continuous actuating surface for a step-by-step rotary movement of the piston and for its return into an initial position; and,
   at least one actuating finger mounted in the body so as to be radially movable in relation to the body, and interacting both with the piston actuating surface and the at least one bearing blade, to actuate the at least one bearing blade radially outwardly during a movement of the piston, wherein the actuation device allows for the circulation of the fluid in the drill string bore at a first, operating, flow rate without any movement of the piston, wherein a movement of the piston in the direction of circulation of the fluid occurs when the fluid circulates at a second, actuation, flow rate greater than said first operating flow rate and wherein an increasing loss of head is caused when the piston moves in the direction of circulation of the fluid by a cooperation of the second profiled portion of the piston bore and the profiled external surface of the protruding profiled element, the movement of the piston allowing an actuation of the stabilizer, the movement being stopped after the actuation has been carried out at which point a loss of head and a pressure of the working fluid are at a maximum, but working fluid still flows through said central bore, and wherein the pressure of the fluid is continuously measured thereby allowing a remote monitoring of the movement of the piston.

2. The device according to claim 1, further comprising a means associated with the piston to prevent it from rotating in one direction and to allow it to rotate in the other direction.

3. The device according to claim 2, wherein the means comprises a free-wheel mounted in the bore of the body of the stabilization device located around the piston, and wherein the piston is connected in terms of rotation and is free in terms of translation in relation to said free-wheel which allows the step-by-step rotary movement of the piston in one direction only.

4. The device according to any one of claims 1, 2, or 3 further comprising an elastic means for returning the at least one blade into a retracted position, said elastic means comprising leaf springs fastened to the body and bearing on an end of the at least one blade.

5. The device according to claim 4, further comprising closing pieces which are arranged above the leaf springs towards an outer surface of the body to ensure that the at least one blade is guided and maintained within slots provided in the outer surface of the body.

6. The device according to claim 1, wherein the stabilizer includes three blades spaced around the outer periphery of the body, and wherein two actuating fingers are associated with each of said three blades, the fingers being each maintained in contact with the actuating surface of the piston, wherein the sets of fingers are circumferentially spaced from one another.

7. The device according to claim 1, wherein the loss of head, caused when the piston moves in relation to the protruding profiled element, is caused by cooperating surfaces on the piston and the profiled element, wherein the profiled element is needle shaped, and wherein an axis of revolution of said profiled element is coaxial with an axis of the drill string.

8. A drill rod stabilizer comprising:
- a tubular body having a first end and a second end and having a bore extending longitudinally therethrough from said first end to said second end;
- at least one bearing blade so mounted on an outer periphery of said body as to be radially movable in relation thereto;
- a piston movably mounted in said bore of said body and actuated by a flow of working fluid through said body bore, said piston being tubular in shape and having a bore extending longitudinally therethrough which piston bore is coaxial with said body bore, said piston bore including an orifice portion said piston also having on its outer surface a plurality of longitudinal grooves whose bottom surfaces are inclined in a radial direction relative to a longitudinal axis of said body and are connected to one another so as to form a continuous actuating surface for a step by step rotary movement of said piston;
- a flow restrictor element secured in said body bore and disposed coaxially with said piston, said element having a tapered external surface which has a maximum outer diameter and a minimum outer diameter, said tapered external surface being adapted to cooperate with said piston bore to limit a flow of fluid therethrough, wherein the maximum outer diameter of said flow restrictor element is sufficiently smaller than a minimum internal diameter of said piston bore so as to leave an annular space through which working fluid continues to flow at all positions of said piston;
- a biasing means for biasing said piston in one direction; and,
- at least one actuating finger slidably mounted in lateral holes in said tubular body so as to be radially movable in said body as said at least one finger interacts with said bearing blade and said piston, said holes in said body being located radially inwardly of said at least one bearing blade and radially outwardly of said piston.

* * * * *